(12) United States Patent
Jiang et al.

(10) Patent No.: US 12,390,891 B2
(45) Date of Patent: Aug. 19, 2025

(54) COMPREHENSIVE QUANTITATIVE EVALUATION METHOD AND SYSTEM FOR WELDING USABILITY OF WELDING CONSUMABLES

(71) Applicant: HARBIN WELDING INSTITUTE LIMITED COMPANY, Heilongjiang (CN)

(72) Inventors: Yinglong Jiang, Harbin (CN); Xiao Guo, Harbin (CN); Chao Wei, Harbin (CN); Kai Xu, Harbin (CN); Ying Han, Harbin (CN); Yujun Xu, Harbin (CN); Xiaochun Lv, Harbin (CN); Zijia Yang, Harbin (CN); Haoquan Yang, Harbin (CN); Bei Song, Harbin (CN); Xiaomei Sun, Harbin (CN)

(73) Assignee: HARBIN WELDING INSTITUTE LIMITED COMPANY, Heilongjiang (CN)

( * ) Notice: Subject to any disclaimer, the term of this patent is extended or adjusted under 35 U.S.C. 154(b) by 0 days.

(21) Appl. No.: 18/020,334

(22) PCT Filed: Aug. 23, 2022

(86) PCT No.: PCT/CN2022/114261
§ 371 (c)(1),
(2) Date: Feb. 8, 2023

(87) PCT Pub. No.: WO2024/007425
PCT Pub. Date: Jan. 11, 2024

(65) Prior Publication Data
US 2025/0128359 A1 Apr. 24, 2025

(30) Foreign Application Priority Data
Jul. 8, 2022 (CN) ............................ 202210815253

(51) Int. Cl.
*B23K 31/12* (2006.01)
*G06N 7/02* (2006.01)

(52) U.S. Cl.
CPC ............. *B23K 31/125* (2013.01); *G06N 7/02* (2013.01)

(58) Field of Classification Search
CPC ............................... B23K 31/125; G06N 7/02
See application file for complete search history.

(56) References Cited

U.S. PATENT DOCUMENTS

2020/0311853 A1* 10/2020 Falde ..................... B23K 31/02
2023/0249276 A1* 8/2023 Park ..................... B23K 9/0953
219/121.13

* cited by examiner

Primary Examiner — Mark A Connolly
(74) Attorney, Agent, or Firm — Spencer Fane, LLP

(57) ABSTRACT

Provided is a comprehensive quantitative evaluation method and system for welding usability of welding consumables. The evaluation method includes: obtaining welding data of target welding consumables; calculating metric values of the welding data corresponding to the target welding consumables, where the metric values include a mean and a variance; establishing a hierarchical structure model; establishing a priority relationship matrix of each level in the hierarchical structure model and calculating a weight set of each level; determining a corresponding membership function according to indicator data of the bottom level of welding usability of the target welding consumables, where the indicator data of the bottom level is the metric value of the welding data corresponding to the target welding consumables; and determining quantitative evaluation indicators of the usability of the target welding consumables using the weight set and a comment set calculated by the membership function according to the hierarchical structure model.

9 Claims, 4 Drawing Sheets

COMPREHENSIVE QUANTITATIVE EVALUATION METHOD AND SYSTEM FOR WELDING USABILITY OF WELDING CONSUMABLES

CROSS REFERENCE TO RELATED APPLICATION

This application claims priority to the Chinese Patent Application No. 202210815253.9, filed with the China National Intellectual Property Administration on Jul. 8, 2022, and entitled "COMPREHENSIVE QUANTITATIVE EVALUATION METHOD AND SYSTEM FOR WELDING USABILITY OF WELDING CONSUMABLES", which is incorporated herein by reference in its entirety.

TECHNICAL FIELD

The present disclosure relates to the field of welding, and in particular, to a comprehensive quantitative evaluation method and system for welding usability of welding consumables.

BACKGROUND

Welding usability of welding consumables is a complex issue affected by the interaction of many factors such as welding consumables, welding power sources, welding process windows, test methods, and welder skills. Many contents are involved, such as arc stability, weld bead size, slag detachability, coverage, spatter, and the fact whether there are welding defects. Although the existing document "Qualification methods of welding procedure for welding consumables" stipulates evaluation methods such as arc stability, slag detachability, re-striking performance, spatter rate, melting coefficient, deposition efficiency, and welding dust generation, there are some deficiencies, and it is difficult to achieve comprehensive quantitative evaluation. There are certain difficulties in the quantitative evaluation of welding process performance. For example, there is no quantitative evaluation standard suitable for engineering needs, there is a lack of effective quantitative evaluation methods, such as weld bead size, wire feeding stability, and arc stability, and there are certain difficulties in comprehensive evaluation methods.

At present, for the evaluation of welding usability of welding consumables, some of the main indicators are mostly used for evaluation, and the factors considered are not comprehensive, but there are many factors that affect the welding usability of welding consumables. Comprehensive quantitative evaluation can provide quantitative data support for designers, manufacturers, and welding consumable suppliers, and through comparison with advanced materials from countries other than China, deficiencies are found, domestic materials in China are improved, and the operational performance of welding consumables and the welding quality of welded components are improved. Therefore, it is particularly important to comprehensively and quantitatively evaluate the welding usability of welding consumables.

SUMMARY

An objective of the present disclosure is to provide a comprehensive quantitative evaluation method and system for welding usability of welding consumables, so as to meet the requirement of comprehensive quantitative evaluation of usability.

To achieve the above objective, the present disclosure provides the following technical solutions:

A comprehensive quantitative evaluation method for welding usability of welding consumables includes:

obtaining welding data of target welding consumables, where the welding data includes an eccentricity, coating strength, a current, a voltage, a length of broken arc, a sleeve length, a penetration depth, a penetration width, welding reinforcement, a contact angle, an inflection point, a range, a slag detachability rate, a spatter rate, soot, a melting coefficient, re-strikeability, a main color, and an area ratio;

calculating metric values of the welding data corresponding to the target welding consumables, where the metric values include a mean and a variance;

establishing a hierarchical structure model, where the hierarchical structure model includes a first level, a second level, a third level, and a fourth level from a top level to a bottom level; indicators of the first level include external quality, welding process quality, and weld bead molding quality; the second level includes related indicators of the first level, and indicators of the second level include at least the eccentricity, the coating strength, arc stability, the spatter rate, the soot, the melting coefficient, the re-strikeability, the length of broken arc, the sleeve length, a weld bead size, straightness, the slag detachability rate, and a weld bead color; the third level includes related indicators of the second level, and indicators of the third level include at least metric values of the eccentricity, the coating strength, the length of broken arc, the sleeve length, the slag detachability rate, the current, the voltage, the penetration depth, the penetration width, the welding reinforcement, the contact angle, the inflection point, the range, the spatter rate, the soot, the melting coefficient, the re-strikeability, the main color, and the area ratio; and the fourth level includes related indicators of the third level, and indicators of the fourth level include at least the metric values of the current, the voltage, the penetration depth, the penetration width, the welding reinforcement, the contact angle, the inflection point, the range, the main color, and the area ratio;

establishing a priority relationship matrix of each level in the hierarchical structure model and calculating a weight set of each level according to the priority relationship matrix, where the priority relationship matrix is established according to importance of indicators in a corresponding level, and the weight set is determined by weight values of all of the indicators in the corresponding level;

determining a corresponding membership function according to indicator data of the bottom level of welding usability of each of the target welding consumables, where the indicator data of the bottom level is the metric value of the welding data corresponding to the target welding consumables; and determining quantitative evaluation indicators of the usability of the target welding consumables using the weight set and a comment set calculated by the membership function according to the hierarchical structure model.

A comprehensive quantitative evaluation system for welding usability of welding consumables includes:

a welding data obtaining module configured to obtain welding data of target welding consumables, where the welding data includes an eccentricity, coating strength, a current, a voltage, a length of broken arc, a sleeve length, a penetration depth, a penetration width, welding reinforcement, a contact angle, an inflection point, a range, a slag detachability rate, a spatter rate, soot, a melting coefficient, re-strikeability, a main color, and an area ratio;

a welding data processing module configured to calculate metric values of the welding data corresponding to the target welding consumables, where the metric values include a mean and a variance; the welding data processing module is further configured to determine a corresponding membership function according to indicator data of the bottom level of welding usability of each of the target welding consumables; and the indicator data of the bottom level is the metric value of the welding data corresponding to the target welding consumables;

a hierarchical structure model establishing module configured to establish a hierarchical structure model, where the hierarchical structure model includes a first level, a second level, a third level, and a fourth level from a top level to a bottom level; indicators of the first level include external quality, welding process quality, and weld bead molding quality; the second level includes related indicators of the first level, and indicators of the second level include at least the eccentricity, the coating strength, arc stability, the spatter rate, the soot, the melting coefficient, the re-strikeability, the length of broken arc, the sleeve length, a weld bead size, straightness, the slag detachability rate, and a weld bead color; the third level includes related indicators of the second level, and indicators of the third level include at least metric values of the eccentricity, the coating strength, the length of broken arc, the sleeve length, the slag detachability rate, the current, the voltage, the penetration depth, the penetration width, the welding reinforcement, the contact angle, the inflection point, the range, the spatter rate, the soot, the melting coefficient, the re-strikeability, the main color, and the area ratio; and the fourth level includes related indicators of the third level, and indicators of the fourth level include at least the metric values of the current, the voltage, the penetration depth, the penetration width, the welding reinforcement, the contact angle, the inflection point, the range, the main color, and the area ratio;

a model processing module configured to establish a priority relationship matrix of each level in the hierarchical structure model and calculating a weight set of each level according to the priority relationship matrix, where the priority relationship matrix is established according to importance of indicators in a corresponding level, and the weight set is determined by weight values of all of the indicators in the corresponding level; and a usability quantitative evaluation indicator determination module configured to determine quantitative evaluation indicators of the usability of the target welding consumables using the weight set and a comment set calculated by the membership function according to the hierarchical structure model.

According to the specific embodiments provided by the present disclosure, the present disclosure discloses the following technical effects:

First, actual welding data of target welding consumables is obtained. Then, metric values of the welding data are calculated. The metric values include a mean and a variance. A corresponding membership function is determined according to indicator data of the bottom level of welding usability of each of the target welding consumables. The indicator data of the bottom level is the metric value of the welding data corresponding to the target welding consumables. A hierarchical structure model is established. A priority relationship matrix of each level in the hierarchical structure model is established and a corresponding weight set of each level is calculated. Quantitative evaluation indicators of the usability of the target welding consumables are determined using the weight set and a comment set calculated by the membership function according to the hierarchical structure model. Through the establishment of the hierarchical structure model and the establishment of the priority relationship matrix, the correlation between the various indicator factors can be clarified. According to the indicator data of the bottom level and the corresponding membership function and weight vector, through layer-by-layer calculation, the comment set of indicators in each level can be obtained, and the obtained indicator evaluation results of the first level can be analyzed to determine the final quantitative evaluation indicators of usability. As a result, the requirement of efficient and comprehensive quantitative evaluation of usability can be met.

DETAILED DESCRIPTION OF THE EMBODIMENTS

All other embodiments obtained by those of ordinary skill in the art based on the embodiments of the present disclosure without creative efforts shall fall within the protection scope of the present disclosure.

An objective of the present disclosure is to provide a comprehensive quantitative evaluation method and system for welding usability of welding consumables, so as to meet the requirement of comprehensive quantitative evaluation of usability. To make the above-mentioned objective, features, and advantages of the present disclosure clearer and more comprehensible, the present disclosure will be further described in detail below in conjunction with the accompanying drawings and specific implementations.

Embodiment 1

Figure 1:
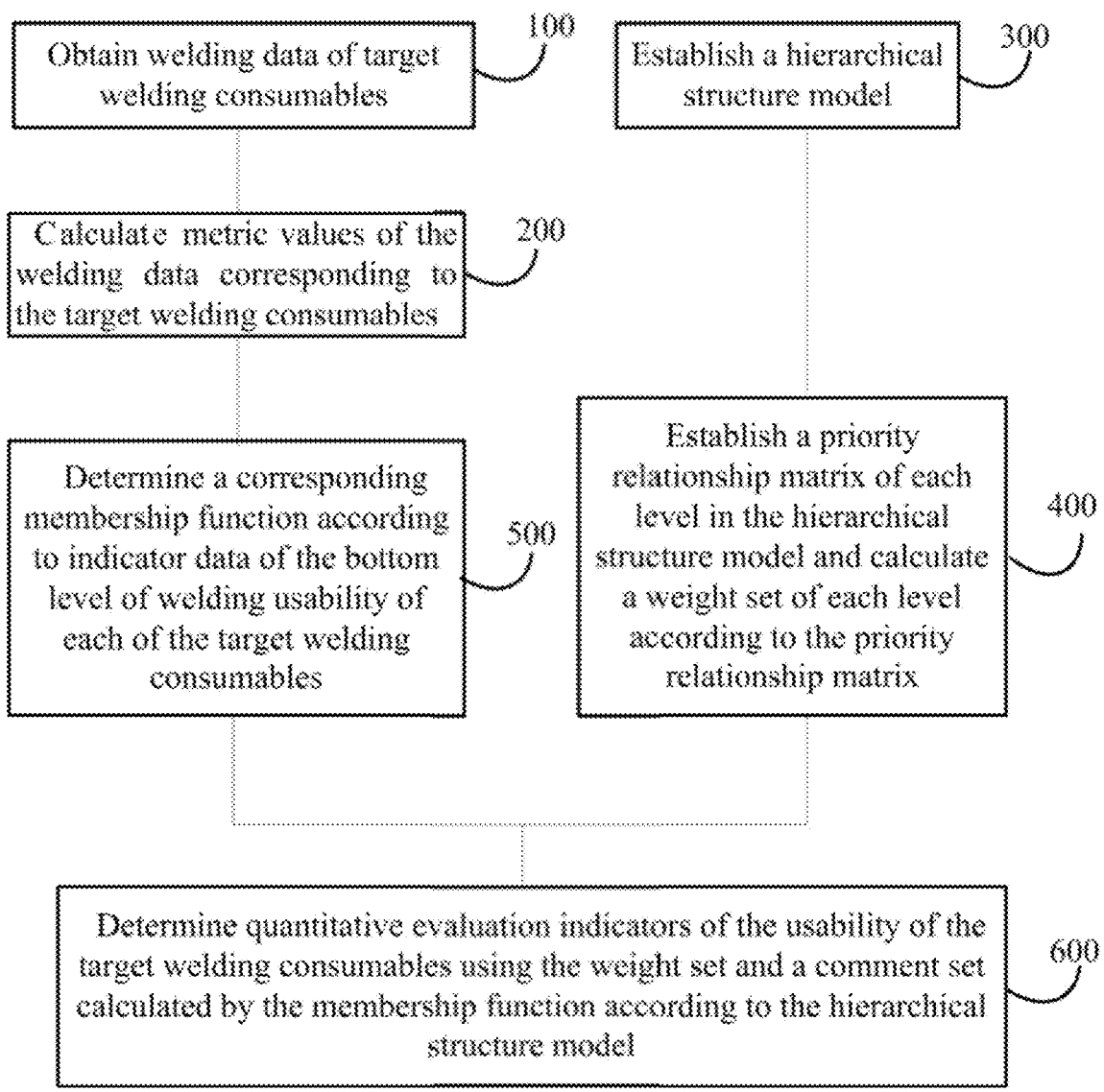
FIG. 1 is a flow chart provided by an embodiment of the present disclosure.

As shown in FIG. 1, a comprehensive quantitative evaluation method for welding usability of welding consumables provided by the embodiment of the present disclosure includes: obtaining welding data of target welding consumables 100, calculating metric values of the welding data corresponding to the target welding consumables 200, establishing a hierarchical structure model 300, establishing a priority relationship matrix of each level in the hierarchical structure model and calculating a weight set of each level according to the priority relationship matrix 400, determining a corresponding membership function according to indicator data of the bottom level of welding usability of each of the target welding consumables 500, and determining quantitative evaluation indicators of the usability of the target welding consumables using the weight set and a comment set calculated by the membership function according to the hierarchical structure model 600.

In step 100, the welding data includes an eccentricity, coating strength, a current, a voltage, a length of broken arc, a sleeve length, a penetration depth, a penetration width, welding reinforcement, a contact angle, an inflection point, a range, a slag detachability rate, a spatter rate, soot, a melting coefficient, re-strikeability, a main color, and an area ratio. The two evaluation indicators of main color and area ratio are for stainless steel welding consumables. The stainless steel is bright white, golden yellow, and colorful after welding. The main color has a largest proportion on the whole. The area ratio is the proportion of each color in the entire stainless steel welding consumable area. For example, bright white accounts for 70% of the whole, golden yellow accounts for 20% of the whole, and colorful colors account for 10% of the whole.

Figure 3:
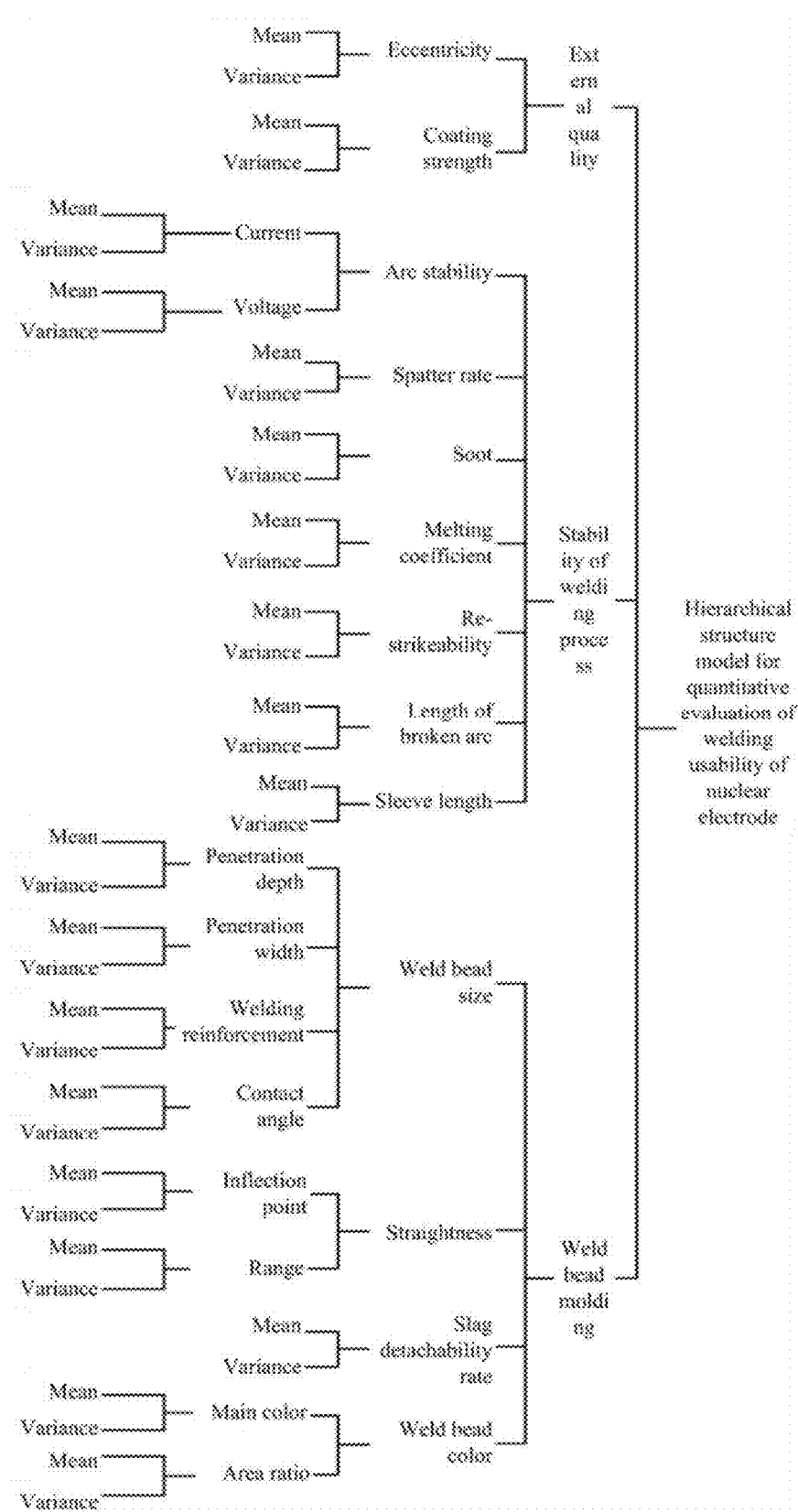
FIG. 3 is a diagram of a hierarchical structure model provided by the embodiment of the present disclosure.

In step 200, the metric values include a mean and a variance, which are analyzed and decomposed, as shown in FIG. 3.

In step 300, the hierarchical structure model is the hierarchical structure model for quantitative evaluation of welding usability of nuclear electrodes in FIG. 3. Specifically, the hierarchical structure model includes four levels. The hierarchical structure model includes a first level, a second level, a third level, and a fourth level from a top level to a bottom level. Indicators of the first level include external quality, welding process quality, and weld bead molding quality (that is, weld bead forming quality). The second level includes related indicators of the first level, and indicators of the second level include at least the eccentricity, the coating strength, arc stability, the spatter rate, the soot, the melting coefficient, the re-strikeability, the length of broken arc, the sleeve length, a weld bead size, straightness, the slag detachability rate, and a weld bead color. The third level includes related indicators of the second level, and indicators of the third level include at least metric values of the eccentricity, the coating strength, the length of broken arc, the sleeve length, the slag detachability rate, the current, the voltage, the penetration depth, the penetration width, the welding reinforcement, the contact angle, the inflection point, the range, the spatter rate, the soot, the melting coefficient, the re-strikeability, the main color, and the area ratio. The fourth level includes related indicators of the third level, and indicators of the fourth level include at least the metric values of the current, the voltage, the penetration depth, the penetration width, the welding reinforcement, the contact angle, the inflection point, the range, the main color, and the area ratio.

In step 400, the priority relationship matrix is established according to importance of indicators in a corresponding level, and the weight set is determined by weight values of all of the indicators in the corresponding level. The weight set is the weight ratio of each indicator. Specifically, a process of calculating a weight set of each level according to the priority relationship matrix specifically includes: calculating a fuzzy consistent matrix of the corresponding level according to the priority relationship matrix; and determining the weight set of the corresponding level according to the fuzzy consistent matrix. Matrix transformation is performed on the priority relationship matrix according to a principle of additive consistency to obtain the fuzzy consistent matrix.

The priority relationship matrix of each level is established according to the relative importance of each corresponding indicator factor in the corresponding level. For the weight set, first, the fuzzy consistent matrix of the corresponding level is constructed from the priority relationship matrix of each level, the weight of each corresponding factor in the fuzzy consistent matrix of each level is calculated, and transpose matrix transformation is performed to obtain a set consisting of the weights of each corresponding factor.

The priority relationship matrix is a matrix established by comparing the relative importance of the factors in each level to the factors in the upper level, also known as the fuzzy complementary matrix, that is:

$$R = (r_{ij})_{n \times n} = \begin{bmatrix} r_{11} & \cdots & r_{1n} \\ \vdots & \ddots & \vdots \\ r_{n1} & \cdots & r_{nn} \end{bmatrix}.$$

The relative importance $r_{ij}$ is: $r_{ij}=0.5+(w_i-w_j)\beta(0<\beta\leq0.5)$. i is an i-th indicator factor in the current level, j is a j-th indicator factor in the current level, and $r_{ij}$ is a fuzzy relationship of the i-th indicator factor relative to the j-th indicator factor. $w_i$ is a weight of importance of the i-th indicator factor, and $w_j$ is a weight of importance of the j-th indicator factor. $\beta$ is a degree to which the difference in the importance between the indicator factors is valued. n is the number of the indicator factors. R is the priority relationship matrix. Indicator factors may also be referred to as factors. A larger $\beta$ indicates a greater degree to which the decision makers value the difference in the importance between the factors. The quantity $r_{ij}$ will be given on a scale of 0.1-0.9 and $r_{ij}+r_{ji}=1$. $r_{ij}$ is the fuzzy relationship of the i-th indicator factor relative to the j-th indicator factor, and $r_{ji}$ is a fuzzy relationship of the j-th indicator factor relative to the i-th indicator factor.

Specifically, the fuzzy consistent matrix transforms the priority relationship matrix of each level according to the principle of additive consistency. The specific transformation process is as follows: $r_{ij}=r_{ik}-r_{jk}+0.5$, $r_i=\Sigma_{k=1}^{n}r_{ik}$, where i=1,2, . . . , n. k is a variable with a value from 1 to n, referring to the k-th factor. $r_{ik}$ is the calculated intermediate quantity. $r_{jk}$ is also the calculated intermediate quantity. Specifically, $r_{ik}$ is a fuzzy relationship of the i-th indicator factor relative to the k-th factor, and $r_{jk}$ is a fuzzy relationship of the j-th indicator factor relative to the k-th factor. $r_i$ is a set of fuzzy relationships of the i-th indicator factor relative to the k-th factor, and $r_j$ is a set of fuzzy relationships of the j-th indicator factor relative to the k-th factor.

Then transformation is performed again:

$$r_{ij} = \frac{r_i - r_j}{2n} + 0.5,$$

so as to transform the priority relationship matrix into the fuzzy consistent matrix. According to the formula:

$$w_i = \frac{1}{n} - \frac{1}{2a} + \frac{1}{na}\sum_{j=1}^{n}r_{ij},$$

a calculated matrix is a matrix with 1 column and n rows, where i=1,2 . . . , n, and:

$$a \geq \frac{n-1}{2}.$$

The weight vector of R is calculated by converting the columns into rows through the transposed matrix: $w=(w_1, w_2, \ldots, w_n)^T$. A smaller a indicates a greater degree to which the decision makers value the influence of the importance between the factors, and the weight set of each factor is derived. T represents the transposed matrix.

In step 500, the indicator data of the bottom level is the metric value of the welding data corresponding to the target welding consumables. The indicator data of the bottom level refers to some indicators of the third level or some indicators of the fourth level, and the indicator data of the bottom level refers to the mean and variance of each indicator factor.

Step 600 specifically includes: calculating the indicator data of the bottom level using the membership function to obtain a comment set of the indicator data of the bottom level corresponding to the indicator data of the bottom level; calculating a comment set of indicator data of an upper level corresponding to the indicator data of the bottom level using the comment set of the indicator data of the bottom level and the weight set corresponding to the indicator data of the bottom level; and determining whether the upper level is the first level; if yes, calculating the quantitative evaluation indicators of the usability of the target welding consumables according to the comment set of the indicator data of the upper level and a weight set corresponding to the indicator data of the upper level; and if not, taking the obtained comment set of the indicator data of the upper level corresponding to the indicator data of the bottom level as the current comment set of the indicator data of the bottom level.

For the comment set of the indicator data of the upper level, the comment set corresponding to each factor data of the bottom level (each factor data of the bottom level is the indicator data of the bottom level) and the corresponding weight set are multiplied and summed to obtain the content set of the indicator data of the upper level corresponding to the indicator data of the bottom level.

Further, when the indicator data of the bottom level is at the fourth level, the process includes the following steps. The data of the indicator factor of the fourth level is calculated by the corresponding membership function to obtain the comment set corresponding to the data of the indicator factor of the fourth level, and the comment set corresponding to the third level that has an indicator association with the indicator data of the fourth level is determined in the hierarchical structure model using the comment set corresponding to the fourth level and the corresponding weight set. Specifically, the comment set corresponding to each factor of the fourth level and the corresponding weight set are multiplied and summed to obtain the comment set corresponding to the third level that has an indicator association with the indicator data of the fourth level. The comment set corresponding to the second level that has an indicator association with the indicator data of the third level is determined in the hierarchical structure model using the comment set corresponding to the third level and the corresponding weight set. The comment set corresponding to the first level that has an indicator association with the indicator data of the second level is determined in the hierarchical structure model using the comment set corresponding to the second level and the corresponding weight set. Quantitative evaluation indicators of the usability of the target welding consumables are determined in the hierarchical structure model using the comment set corresponding to the first level and the corresponding weight set.

Furthermore, when the indicator data of the bottom level is at the third level, the process specifically includes the following steps. The data of the indicator factor of the third level is calculated by the corresponding membership function to obtain the comment set corresponding to the data of the indicator factor of the third level. The comment set corresponding to the second level that has an indicator association with the indicator data of the third level is determined in the hierarchical structure model using the comment set corresponding to the third level and the corresponding weight set. The comment set corresponding to the first level that has an indicator association with the indicator data of the second level is determined in the hierarchical structure model using the comment set corresponding to the second level and the corresponding weight set. Quantitative evaluation indicators of the usability of the target welding consumables are determined in the hierarchical structure model using the comment set corresponding to the first level and the corresponding weight set.

The TS-sugeno fuzzy model converts normal fuzzy rules and their reasoning into a mathematical expression. A linear equation is used to represent the local rules of each local area. Based on the local linearization, the global nonlinearity is realized by fuzzy reasoning, which has good approximation performance. In this embodiment, the TS fuzzy model is selected. Since the weight vector is calculated subsequently, the model is derived by means of summation, so as to ensure that the sum of the subsequent output vectors is 1.

Specifically, the indicator data of the bottom level of the welding usability is calculated using the membership function to obtain a comment set of the indicator data of the bottom level, and the comment set of the indicator data of the bottom level and the weight set corresponding to the indicator data of the bottom level are calculated to obtain a comment set of indicator data of an upper level corresponding to the indicator data of the bottom level. Taking the metric value of the current as the indicator data of the bottom level as an example, the indicator data of the bottom level includes the mean and variance of the current. A process of calculating the comment set of the current specifically includes the following steps. First, the comment set of the mean and variance of the current is determined according to the membership function, and then the comment set of the mean of the current is multiplied by the weight of the mean of the current, and the comment set of the variance of the current is multiplied by the weight of the variance of the current. Finally, the two products obtained are added together to obtain the comment set of the current.

Further, the membership function adopts the form of triangular distribution to establish five evaluation criteria: excellent, good, average, poor, and terrible. The membership function is different for each sampling indicator, so it is necessary to cover all the sampling indicators in the same experimental conditions in this membership function, and five evaluation criteria are established for each level of indicators: excellent, good, average, poor, and terrible. The membership function is evaluated by the triangular distribution membership function commonly used in the TS fuzzy model.

The specific operation process of this evaluation method can also be as follows.

1. The determination of indicators of welding usability is affected. Based on the entire welding process, the usability of the welding consumables is decomposed into three aspects: the welding consumable preparation quality (external quality), the performance of the welding consumable welding process (the welding process quality), and the weld bead quality (the weld bead molding quality), for example, the relaxation diameter and particle size in the preparation quality (external quality), the arc stability, re-strikeability, spatter rate, melting coefficient, and welding dust generation in the welding process, and the weld bead size and lap quality in the weld bead molding quality.

2. The hierarchical structure model that affects the welding usability is established. The welding consumables include electrodes, welding wires, welding strips, and welding fluxes. Due to the large number of indicators and the relationship between upper and lower levels, when the hierarchical structure model is established, the indicators are processed hierarchically to establish indicators in each level, and decomposed down until the data can be directly measured finally.

3. The priority relationship matrix is established. The priority relationship matrix of all indicators is established, and Tables 1 to 4 are some examples of indicator factors in various levels established in the present embodiment.

Table 1 is the priority relationship matrix table of the indicator factors in the first level. The priority relationship matrix of the indicator factors in the first level is the first-level indicator priority relationship matrix.

TABLE 1

First-level indicator priority relationship matrix table

| First-level indicator | External quality | Welding process quality | Weld bead forming quality |
|---|---|---|---|
| External quality | 0.5 | 0.6 | 0.8 |
| Welding process quality | 0.4 | 0.5 | 0.6 |
| Weld bead forming quality | 0.2 | 0.4 | 0.5 |

Table 2 is the priority relationship matrix table of the indicator factors in the second level corresponding to the welding process quality. The priority relationship matrix of the indicator factors in the second level is the second-level indicator priority relationship matrix of the welding process quality.

TABLE 2

Second-level indicator priority relationship matrix table of welding process quality

| Second-level indicator | Arc stability | Spatter rate | Soot | Melting coefficient | Sleeve length | Length of broken arc | Re-strikeability |
|---|---|---|---|---|---|---|---|
| Arc stability | 0.5 | 0.2 | 0.2 | 0.2 | 0.2 | 0.1 | 0.2 |
| Spatter rate | 0.8 | 0.5 | 0.3 | 0.4 | 0.7 | 0.4 | 0.55 |
| Soot | 0.8 | 0.7 | 0.5 | 0.7 | 0.8 | 0.6 | 0.6 |
| Melting coefficient | 0.8 | 0.6 | 0.3 | 0.5 | 0.4 | 0.6 | 0.6 |
| Sleeve length | 0.8 | 0.3 | 0.2 | 0.6 | 0.5 | 0.8 | 0.7 |
| Length of broken arc | 0.9 | 0.6 | 0.4 | 0.4 | 0.2 | 0.5 | 0.45 |
| Re-strikeability | 0.8 | 0.45 | 0.4 | 0.4 | 0.3 | 0.55 | 0.5 |

Table 3 is the priority relationship matrix table of the indicator factors in the third level corresponding to the arc stability in the welding process quality, that is, the third-level indicator (welding process quality) priority relationship matrix of the arc stability.

TABLE 3

Third-level indicator priority relationship matrix table of arc stability

| | Second-level indicator Arc stability | |
|---|---|---|
| Third-level indicator | Current | Voltage |
| Current | 0.5 | 0.2 |
| Voltage | 0.8 | 0.5 |

Table 4 is the priority relationship matrix table of the indicator factors of the fourth level corresponding to the current and voltage in the third level respectively, that is, the fourth-level indicator priority relationship matrix table.

TABLE 4

Fourth-level indicator priority relationship matrix table

| | Third-level indicator | | | |
|---|---|---|---|---|
| | Current | | Voltage | |
| Fourth-level indicator | Mean | Variance | Mean | Variance |
| Mean | 0.5 | 0.8 | 0.5 | 0.8 |
| Mean square error | 0.2 | 0.5 | 0.2 | 0.5 |

4. The fuzzy consistent matrix is constructed, the weight set is calculated, and the priority relationship matrix is calculated using the principle of additive consistency. The data calculated from the data in Tables 1 to 4 are shown in Tables 5 to 8. Table 5 is the fuzzy consistent matrix table of the indicator factors in the first level, that is, the first-level indicator fuzzy consistent matrix table.

TABLE 5

First-level indicator fuzzy consistent matrix table

| First-level indicator | External quality | Welding process quality | Weld bead forming quality |
|---|---|---|---|
| External quality | 0.500 | 0.567 | 0.633 |
| Welding process quality | 0.433 | 0.500 | 0.567 |
| Weld bead forming quality | 0.367 | 0.433 | 0.500 |

Table 6 is the fuzzy consistent matrix table of the indicator factors in the second level in the welding process quality, that is, the second-level indicator fuzzy consistent matrix table of the welding process quality.

TABLE 6

Second-level indicator fuzzy consistent matrix table of welding process quality

| Second-level indicator | Arc stability | Spatter rate | Soot | Melting coefficient | Sleeve length | Length of broken arc | Re-strikeability |
|---|---|---|---|---|---|---|---|
| Arc stability | 0.500 | 0.354 | 0.279 | 0.343 | 0.336 | 0.368 | 0.371 |
| Spatter rate | 0.646 | 0.500 | 0.425 | 0.489 | 0.482 | 0.514 | 0.518 |
| Soot | 0.721 | 0.575 | 0.500 | 0.564 | 0.557 | 0.589 | 0.593 |
| Melting coefficient | 0.657 | 0.511 | 0.436 | 0.500 | 0.493 | 0.525 | 0.529 |
| Sleeve length | 0.664 | 0.518 | 0.443 | 0.507 | 0.500 | 0.532 | 0.536 |
| Length of broken arc | 0.632 | 0.486 | 0.411 | 0.475 | 0.468 | 0.500 | 0.504 |
| Re-strikeability | 0.629 | 0.482 | 0.407 | 0.471 | 0.464 | 0.496 | 0.500 |

Table 7 is the fuzzy consistent matrix table of the indicator factors in the third level corresponding to the arc stability in the welding process quality, that is, the third-level indicator fuzzy consistent matrix table.

TABLE 7

Third-level indicator fuzzy consistent matrix table

| | Second-level indicator Arc stability | |
|---|---|---|
| Third-level indicator | Current | Voltage |
| Current | 0.500 | 0.350 |
| Voltage | 0.650 | 0.500 |

Table 8 is the fuzzy consistent matrix table of the indicator factors of the fourth level corresponding to the current and voltage in the third level respectively, that is, the fourth-level indicator fuzzy consistent matrix table.

TABLE 8

Fourth-level indicator fuzzy consistent matrix table

| | Third-level indicator | | | |
|---|---|---|---|---|
| | Current | | Voltage | |
| Fourth-level indicator | Mean | Variance | Mean | Variance |
| Mean | 0.500 | 0.650 | 0.500 | 0.650 |
| Mean square error | 0.350 | 0.500 | 0.350 | 0.500 |

According to the calculation method of the weight vector, the fuzzy consistent matrix is calculated. In the weight vector $W_{1234}$, W represents the weight vector, the number of subscript numbers corresponds to the level of the indicator, and the number represents the position of the level of the indicator.

Taking the data in $W_1$ as an example, the first column represents the weight of the external quality, the second column represents the weight of the welding process quality, and the third column represents the weight of the weld bead forming quality. The weight vector of the target is calculated according to the data in Table 5 to 8, as follows:

$$W_1 = [0.200\ 0.333\ 0.467].$$

$W_{12}$ represents the weight set of the indicator of the second level corresponding to the second factor of the indicator factors of the first level, that is, the weight set of the indicator of the second level corresponding to the second column in $W_1$, that is, the weight set of the second-level indicator corresponding to the welding process quality. The first column of $W_{12}$ represents the weight of the arc stability. The second column represents the weight of the spatter rate. The third column represents the weight of the soot. The fourth column represents the weight of the melting coefficient. The fifth column represents the weight of the re-strikeability. The sixth column represents the weight of the length of broken arc. The seventh column represents the weight of the sleeve length.

$$W_{12} = [0.233\ 0.136\ 0.086\ 0.129\ 0.124\ 0.145\ 0.148]$$

$W_{121}$ represents the weight set of the indicator of the third level corresponding to the first factor of the indicator factors of the second level, that is, the weight set of the indicator of the third level corresponding to the first column in $W_{12}$, that is, the weight set of the third-level indicator corresponding to the arc stability. The first column of $W_{121}$ represents the weight of the current. The second column represents the weight of the voltage.

$$W_{121} = [0.650\ 0.350]$$

$W_{122}$ represents the weight set of the indicator of the third level corresponding to the second factor of the indicator factors of the second level, that is, the weight set of the indicator of the third level corresponding to the second column in $W_{12}$, that is, the weight set of the third-level indicator corresponding to the spatter rate. The first column of $W_{122}$ represents the weight of the mean of the spatter rate in the welding data. The second column represents the weight of the variance of the spatter rate in the welding data.

$$W_{122} = [0.400\ 0.600]$$

$W_{123}$ represents the weight set of the indicator of the third level corresponding to the third factor of the indicator factors of the second level, that is, the weight set of the indicator of the third level corresponding to the third column in $W_{12}$, that is, the weight set of the third-level indicator corresponding to the soot. The first column of $W_{123}$ represents the weight of the mean of the soot in the welding data. The second column represents the weight of the variance of the soot in the welding data.

$$W_{123} = [0.450\ 0.550]$$

$W_{124}$ represents the weight set of the indicator of the third level corresponding to the fourth factor of the indicator factors of the second level, that is, the weight set of the indicator of the third level corresponding to the fourth column in $W_{12}$, that is, the weight set of the third-level indicator corresponding to the melting coefficient. The first column of $W_{124}$ represents the weight of the mean of the melting coefficient in the welding data. The second column represents the weight of the variance of the melting coefficient in the welding data.

$$W_{124} = [0.350\ 0.450]$$

$W_{125}$ represents the weight set of the indicator of the third level corresponding to the fifth factor of the indicator factors of the second level, that is, the weight set of the indicator of the third level corresponding to the fifth column in $W_{12}$, that is, the weight set of the third-level indicator corresponding to the re-strikeability. The first column of $W_{125}$ represents the weight of the mean of the re-strikeability in the welding data. The second column represents the weight of the variance of the re-strikeability in the welding data.

$$W_{125} = [0.600\ 0.400]$$

$W_{126}$ represents the weight set of the indicator of the third level corresponding to the sixth factor of the indicator factors of the second level, that is, the weight set of the indicator of the third level corresponding to the sixth column in $W_{12}$, that is, the weight set of the third-level indicator corresponding to the length of broken arc. The first column of $W_{126}$ represents the weight of the mean of the length of broken arc. The second column represents the weight of the variance of the length of broken arc.

$$W_{126} = [0.550\ 0.450]$$

$W_{127}$ represents the weight set of the indicator of the third level corresponding to the seventh factor of the indicator factors of the second level, that is, the weight set of the indicator of the third level corresponding to the seventh column in $W_{12}$, that is, the weight set of the third-level indicator corresponding to the sleeve length. The first column of $W_{127}$ represents the weight of the mean of the sleeve length. The second column represents the weight of the variance of the sleeve length.

$$W_{127} = [0.650\ 0.350]$$

$W_{1211}$ represents the weight set of the indicator of the fourth level corresponding to the first factor of the indicator factors of the third level, that is, the weight set of the indicator of the fourth level corresponding to the first column in $W_{121}$, that is, the weight set of the fourth-level indicator corresponding to the current. The first column of $W_{1211}$ represents the weight of the mean of the current. The second column represents the weight of the variance of the current.

$$W_{1211} = [0.350\ 0.650]$$

$W_{1212}$ represents the weight set of the indicator of the fourth level corresponding to the second factor of the indicator factors of the third level, that is, the weight set of the indicator of the fourth level corresponding to the second column in $W_{121}$, that is, the weight set of the fourth-level indicator corresponding to the voltage. The first column of $W_{1212}$ represents the weight of the mean of the voltage. The second column represents the weight of the variance of the voltage.

$$W_{1212} = [0.350\ 0.650]$$

Figure 4:
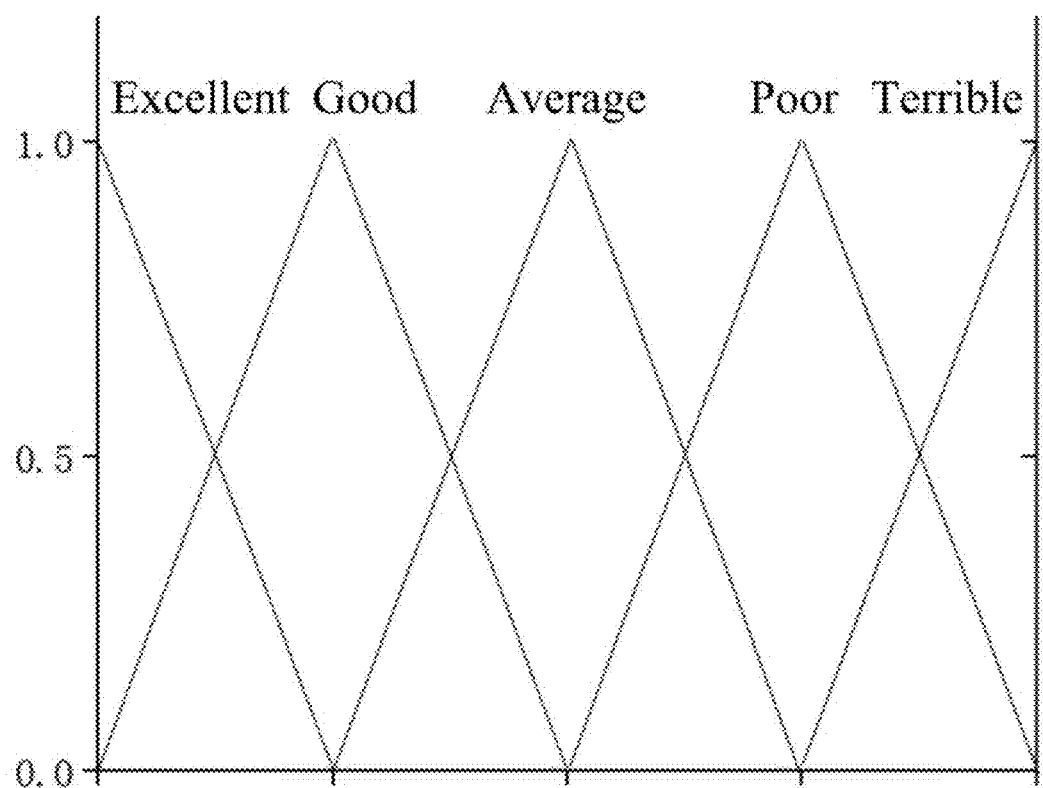
FIG. 4 is a schematic diagram of a membership function provided by the embodiment of the present disclosure.

5. The membership functions of indicators in all levels is determined. As shown in FIG. 4, the abscissa is the collection range of the lowest level sampling data (including the maximum and minimum values of sampling), and the ordinate is the degree of membership. Due to the summation method, the sum of the degree of membership at the same level is 1.

6. The indicators of the bottom levels are acquired and calculated, that is, the data that can be directly measured in the hierarchical structure is acquired and calculated according to the indicators in the hierarchical structure model. Taking the current and voltage as examples, the values of voltage and current are measured, and the corresponding variance and mean of voltage and current are calculated respectively.

The data is sampled by the equipment corresponding to the sampling indicator, and the data obtained by data sorting and calculation is shown in Table 9.

TABLE 9

Statistical calculation results of sampling data

| Indicator | Mean of current | Variance of current | Mean of voltage | Variance of voltage | Spatter rate | Welding soot | Melting coefficient | Sleeve length | Length of broken arc | Re-strikeability |
|---|---|---|---|---|---|---|---|---|---|---|
| Results | 174.7 | 15.2 | 23.1 | 4.7 | 3.1 | 13.45 | 8.09 | 0.8 | 17 | 1 |

7. Indicators in all levels are calculated. The indicators of the bottom level are calculated through the membership function, and the comment set vector (comment set), that is, the evaluation, of the indicators of the bottom level is obtained. According to the comment set of the indicators of the bottom level, the comment set of the upper level corresponding to the data of the bottom level is calculated. Taking the current and voltage as examples, according to the comment set of the mean and variance of the current and the comment set of the mean and variance of the voltage, the comment sets of the current and the voltage, that is, the evaluation, are obtained, as shown in Table 10.

TABLE 10

Current and voltage evaluation table

| SN | Indicator | Excellent | Good | Average | Poor | Terrible |
|---|---|---|---|---|---|---|
| 1 | Current | 0.262 | 0.088 | 0.39 | 0.26 | 0 |
|   | Voltage | 0 | 0.28 | 0.2 | 0.52 | 0 |

The comment set of the indicators of the bottom level is determined through the membership function. The comment set and the weight vector are multiplied to obtain the comment set vector of the indicator of the upper level. Taking the variance and mean of the current as examples, the comment set of the variance and mean of the current is calculated through the membership function. The comment set of the current can be obtained by multiplying and summing the comment set with the corresponding weights (variance and mean of the current).

The data obtained by layer-by-layer calculation are shown in Table 11, the second-level indicator evaluation result table and Table 12, the first-level indicator evaluation result table.

TABLE 11

Second-level indicator evaluation result table

| Arc stability | 0.170 | 0.155 | 0.324 | 0.351 | 0.000 |
|---|---|---|---|---|---|
| Spatter rate | 0 | 0.6 | 0.4 | 0 | 0 |
| Soot | 0 | 0 | 0 | 0.244 | 0.756 |
| Melting coefficient | 0.27 | 0.18 | 0 | 0.198 | 0.352 |
| Sleeve length | 0.48 | 0.52 | 0 | 0 | 0 |
| Length of broken arc | 0 | 0.4 | 0.6 | 0 | 0 |
| Re-strikeability | 1 | 0 | 0 | 0 | 0 |

TABLE 12

First-level indicator evaluation result table

| Indicator | Excellent | Good | Average | Poor | Terrible |
|---|---|---|---|---|---|
| External quality | 0.600 | 0.132 | 0.268 | 0.000 | 0 |
| Welding process | 0.281 | 0.263 | 0.217 | 0.128 | 0.110 |
| Weld bead forming quality | 0.116 | 0.273 | 0.215 | 0.355 | 0.040 |

8. Final evaluation results

Through the calculation, the vectors of the final comprehensive quantitative comment set of the welding usability of the welding consumables are obtained, as shown in Table 13, which correspond to excellent, good, average, poor, and terrible respectively, with the values of 0.268, 0.242, 0.226, 0.209, and 0.055. According to the principle of maximum membership, it is judged as excellent, with a proportion of 0.268.

TABLE 13

Comprehensive quantitative evaluation result table

| Level | Excellent | Good | Average | Poor | Terrible |
|---|---|---|---|---|---|
| Results | 0.268 | 0.242 | 0.226 | 0.209 | 0.055 |

As an optional implementation, after the quantitative evaluation indicators of the usability of the target welding consumables (also called comprehensive quantitative evaluation results) are determined, the formula of the target welding consumables or the welding preparation process can also be adjusted according to the final detection result.

Embodiment 2

Figure 2:
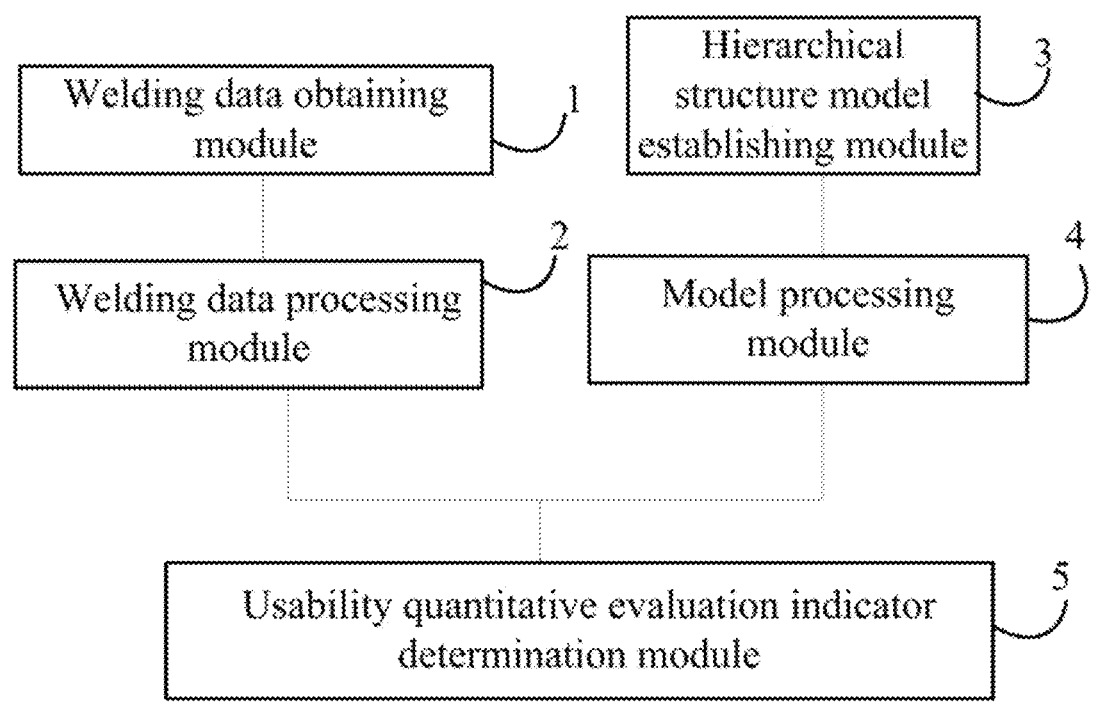
FIG. 2 is a structural diagram provided by the embodiment of the present disclosure.

As shown in FIG. 2, a comprehensive quantitative evaluation system for welding usability of welding consumables provided by the present embodiment includes: a welding data obtaining module 1, a welding data processing module 2, a hierarchical structure model establishing module 3, a model processing module 4, and a usability quantitative evaluation indicator determination module 5.

The welding data obtaining module 1 is configured to obtain welding data of target welding consumables.

The welding data processing module 2 is configured to calculate metric values of the welding data corresponding to the target welding consumables. The welding data processing module 2 is further configured to determine a corresponding membership function according to indicator data of the bottom level of welding usability of each of the target welding consumables.

The hierarchical structure model establishing module 3 is configured to establish a hierarchical structure model.

The model processing module 4 is configured to establish a priority relationship matrix of each level in the hierarchical structure model and calculating a weight set of each level according to the priority relationship matrix. Specifically, a priority relationship matrix of each level in the hierarchical structure model is established and a weight set is calculated. The priority relationship matrix of each level is established according to the relative importance of each corresponding indicator factor in the corresponding level. For the weight set, first, the fuzzy consistent matrix of the corresponding level is constructed from the priority relationship matrix of each level, the weight of each corresponding factor in the fuzzy consistent matrix of each level is calculated, and transpose matrix transformation is performed to obtain a set consisting of the weights of each corresponding factor.

The usability quantitative evaluation indicator determination module 5 is configured to determine quantitative evaluation indicators of the usability of the target welding consumables using the weight set and a comment set calculated by the membership function according to the hierarchical structure model. Specifically, to calculate the comment set first, the membership function is determined according to the indicator data of the bottom level, and then the comment set of the indicator data of the bottom level is calculated. The indicator data of the bottom level may be the indicator data of the third level or the indicator data of the fourth level. However, the indicator data of the bottom level is a metric value of welding data. When the indicator data of the bottom level is at the fourth level, the comment set of the factors of the fourth level is multiplied and summed with the weights corresponding to the indicator factors of the fourth level to obtain the corresponding comment set of the indicator factors of the third level. The corresponding weight set of the indicator factors of the third level is multiplied and summed with the comment set of the third level to obtain the corresponding comment set of the indicator factors of the second level. The corresponding weight set of the indicator factors of the second level is multiplied and summed with the comment set of the second level to obtain the corresponding comment set of the indicator factors of the first level. The maximum membership principle of the membership function is used to judge the comment set of the indicator factors of the first level, so as to obtain the quantitative evaluation indicators of the usability of the target welding consumables.

Optionally, the welding data obtaining module 1 includes detection instruments corresponding to the welding data of the target welding consumables. The indicators are acquired with corresponding detection instruments, such as eccentrics, steel rulers, particle size analyzers, arc analyzers, and near-phase microscopes, and the sampling data is statistically sorted.

The descriptions of the foregoing embodiments are only used to help understand methods and core concepts of the present disclosure. For those of ordinary skill in the art, according to the ideas of the present disclosure, there may be changes in the specific implementation and application scope. In conclusion, the content of this specification shall not be construed as a limitation to the present disclosure.

What is claimed is:

1. A comprehensive quantitative evaluation method for welding usability of welding consumables, comprising:
   obtaining welding data of target welding consumables, wherein the welding data comprises an eccentricity, coating strength, a current, a voltage, a length of broken arc, a sleeve length, a penetration depth, a penetration width, welding reinforcement, a contact angle, an inflection point, a range, a slag detachability rate, a spatter rate, soot, a melting coefficient, re-strikeability, a main color, and an area ratio;
   calculating metric values of the welding data corresponding to the target welding consumables, wherein the metric values comprise a mean and a variance;
   establishing a hierarchical structure model, wherein the hierarchical structure model comprises a first level, a second level, a third level, and a fourth level from a top level to a bottom level; indicators of the first level comprise external quality, welding process quality, and weld bead molding quality; the second level comprises related indicators of the first level, and indicators of the second level comprise at least the eccentricity, the coating strength, arc stability, the spatter rate, the soot, the melting coefficient, the re-strikeability, the length of broken arc, the sleeve length, a weld bead size, straightness, the slag detachability rate, and a weld bead color; the third level comprises related indicators of the second level, and indicators of the third level comprise at least metric values of the eccentricity, the coating strength, the length of broken arc, the sleeve length, the slag detachability rate, the current, the voltage, the penetration depth, the penetration width, the welding reinforcement, the contact angle, the inflection point, the range, the spatter rate, the soot, the melting coefficient, the re-strikeability, the main color, and the area ratio; and the fourth level comprises related indicators of the third level, and indicators of the fourth level comprise at least the metric values of the current, the voltage, the penetration depth, the penetration width, the welding reinforcement, the contact angle, the inflection point, the range, the main color, and the area ratio;
   establishing a priority relationship matrix of each level in the hierarchical structure model and calculating a weight set of each level according to the priority relationship matrix, wherein the priority relationship matrix is established according to importance of indicators in a corresponding level, and the weight set is determined by weight values of all of the indicators in the corresponding level;
   determining a corresponding membership function according to indicator data of the bottom level of welding usability of each of the target welding consumables, wherein the indicator data of the bottom level is the metric value of the welding data corresponding to the target welding consumables; and
   determining quantitative evaluation indicators of the usability of the target welding consumables using the weight set and a comment set calculated by the membership function according to the hierarchical structure model.

2. The comprehensive quantitative evaluation method for welding usability of welding consumables according to claim 1, wherein a process of calculating a weight set of each level according to the priority relationship matrix specifically comprises:
   calculating a fuzzy consistent matrix of the corresponding level according to the priority relationship matrix; and
   determining the weight set of the corresponding level according to the fuzzy consistent matrix.

3. The comprehensive quantitative evaluation method for welding usability of welding consumables according to claim 2, wherein matrix transformation is performed on the priority relationship matrix according to a principle of additive consistency to obtain the fuzzy consistent matrix.

4. The comprehensive quantitative evaluation method for welding usability of welding consumables according to claim 1, wherein a process of determining quantitative evaluation indicators of the usability of the target welding consumables using the weight set and a comment set calculated by the membership function according to the hierarchical structure model specifically comprises:
   calculating the indicator data of the bottom level using the membership function to obtain a comment set of the indicator data of the bottom level corresponding to the indicator data of the bottom level;
   calculating a comment set of indicator data of an upper level corresponding to the indicator data of the bottom level using the comment set of the indicator data of the bottom level and the weight set corresponding to the indicator data of the bottom level; and determining whether the upper level is the first level;

if yes, calculating the quantitative evaluation indicators of the usability of the target welding consumables according to the comment set of the indicator data of the upper level and a weight set corresponding to the indicator data of the upper level; and if not, taking the obtained comment set of the indicator data of the upper level corresponding to the indicator data of the bottom level as the current comment set of the indicator data of the bottom level.

5. The comprehensive quantitative evaluation method for welding usability of welding consumables according to claim 4, wherein a process of calculating a comment set of indicator data of an upper level corresponding to the indicator data of the bottom level using the comment set of the indicator data of the bottom level and the weight set corresponding to the indicator data of the bottom level specifically comprises:

multiplying and summing the comment set corresponding to each factor data of the bottom level and the corresponding weight set to obtain the comment set of the indicator data of the upper level corresponding to the indicator data of the bottom level.

6. A comprehensive quantitative evaluation system for welding usability of welding consumables, comprising:

a welding data obtaining module configured to obtain welding data of target welding consumables, wherein the welding data comprises an eccentricity, coating strength, a current, a voltage, a length of broken arc, a sleeve length, a penetration depth, a penetration width, welding reinforcement, a contact angle, an inflection point, a range, a slag detachability rate, a spatter rate, soot, a melting coefficient, re-strikeability, a main color, and an area ratio;

a welding data processing module configured to calculate metric values of the welding data corresponding to the target welding consumables, wherein the metric values comprise a mean and a variance; the welding data processing module is further configured to determine a corresponding membership function according to indicator data of the bottom level of welding usability of each of the target welding consumables; and the indicator data of the bottom level is the metric value of the welding data corresponding to the target welding consumables;

a hierarchical structure model establishing module configured to establish a hierarchical structure model, wherein the hierarchical structure model comprises a first level, a second level, a third level, and a fourth level from a top level to a bottom level; indicators of the first level comprise external quality, welding process quality, and weld bead molding quality; the second level comprises related indicators of the first level, and indicators of the second level comprise at least the eccentricity, the coating strength, arc stability, the spatter rate, the soot, the melting coefficient, the re-strikeability, the length of broken arc, the sleeve length, a weld bead size, straightness, the slag detachability rate, and a weld bead color; the third level comprises related indicators of the second level, and indicators of the third level comprise at least metric values of the eccentricity, the coating strength, the length of broken arc, the sleeve length, the slag welding reinforcement, the contact angle, the inflection point, the range, the spatter rate, the soot, the melting coefficient, the re-strikeability, the main color, and the area ratio; and the fourth level comprises related indicators of the third level, and indicators of the fourth level comprise at least the metric values of the current, the voltage, the penetration depth, the penetration width, the welding reinforcement, the contact angle, the inflection point, the range, the main color, and the area ratio;

a model processing module configured to establish a priority relationship matrix of each level in the hierarchical structure model and calculating a weight set of each level according to the priority relationship matrix, wherein the priority relationship matrix is established according to importance of indicators in a corresponding level, and the weight set is determined by weight values of all of the indicators in the corresponding level; and a usability quantitative evaluation indicator determination module configured to determine quantitative evaluation indicators of the usability of the target welding consumables using the weight set and a comment set calculated by the membership function according to the hierarchical structure model.

7. The comprehensive quantitative evaluation system for welding usability of welding consumables according to claim 6, wherein the model processing module further comprises: a fuzzy consistent matrix calculation module and a weight set determination module;

the fuzzy consistent matrix calculation module is configured to calculate a fuzzy consistent matrix of the corresponding level according to the priority relationship matrix; and the weight set determination module is configured to determine the weight set of the corresponding level according to the fuzzy consistent matrix.

8. The comprehensive quantitative evaluation system for welding usability of welding consumables according to claim 6, wherein the usability quantitative evaluation indicator determination module further comprises:

an evaluation indicator determination sub-module configured to perform the following operations: calculating the indicator data of the bottom level using the membership function to obtain a comment set of the indicator data of the bottom level corresponding to the indicator data of the bottom level;

calculating a comment set of indicator data of an upper level corresponding to the indicator data of the bottom level using the comment set of the indicator data of the bottom level and the weight set corresponding to the indicator data of the bottom level; and determining whether the upper level is the first level;

if yes, calculating the quantitative evaluation indicators of the usability of the target welding consumables according to the comment set of the indicator data of the upper level and a weight set corresponding to the indicator data of the upper level; and if not, taking the obtained comment set of the indicator data of the upper level corresponding to the indicator data of the bottom level as the current comment set of the indicator data of the bottom level.

9. The comprehensive quantitative evaluation system for welding usability of welding consumables according to claim 6, wherein the welding data obtaining module comprises detection instruments corresponding to the welding data of the target welding consumables.

* * * * *